(12) United States Patent
Delpisheh et al.

(10) Patent No.: US 12,106,038 B1
(45) Date of Patent: Oct. 1, 2024

(54) SYSTEM AND METHOD FOR TEXT-TO-TEXT TRANSFORMATION OF QUALITATIVE RESPONSES

(71) Applicant: Fulcrum Management Solutions Ltd., Rossland (CA)

(72) Inventors: Marjan Delpisheh, Rossland (CA); Farhad Imani, Rossland (CA)

(73) Assignee: Fulcrum Management Solutions Ltd., Rossland (CA)

( * ) Notice: Subject to any disclaimer, the term of this patent is extended or adjusted under 35 U.S.C. 154(b) by 0 days.

(21) Appl. No.: 18/537,465

(22) Filed: Dec. 12, 2023

Related U.S. Application Data

(63) Continuation of application No. 18/483,960, filed on Oct. 10, 2023.

(51) Int. Cl.
*G06F 40/30* (2020.01)
*G06F 40/151* (2020.01)

(52) U.S. Cl.
CPC ............ *G06F 40/151* (2020.01); *G06F 40/30* (2020.01)

(58) Field of Classification Search
None
See application file for complete search history.

(56) References Cited

U.S. PATENT DOCUMENTS

2017/0004129 A1* 1/2017 Shalaby ................ G06F 40/242
2022/0108195 A1* 4/2022 Kehler .................... G06V 10/82

FOREIGN PATENT DOCUMENTS

WO WO-2012162405 A1 * 11/2012 ....... G06F 17/30707

OTHER PUBLICATIONS

Egozi et al., "Concept-Based Information Retrieval Using Explicit Semantic Analysis" ACM Trans. Inf. Syst. 29, 2, Article 8 (Apr. 2011), 34 pages. (Year: 2011).*

* cited by examiner

*Primary Examiner* — Amelia L Tapp
(74) *Attorney, Agent, or Firm* — Marin Patents LLC; Gustavo Marin

(57) ABSTRACT

A system and method for text-to-text transformation of thought objects. A transformation computer receives a plurality of thought objects from user devices. The thought object contains qualitative responses. Transformation computer processes the received thought objects into a semantic vector representation. Redundant thought objects are removed to generate a reduced plurality of thought objects. The reduced thought objects are then clustered using semantic vector representation. One or more of the thought objects are selected for transformation from the clusters. A transformer generates a summary using one or more of the selected thought objects.

20 Claims, 12 Drawing Sheets

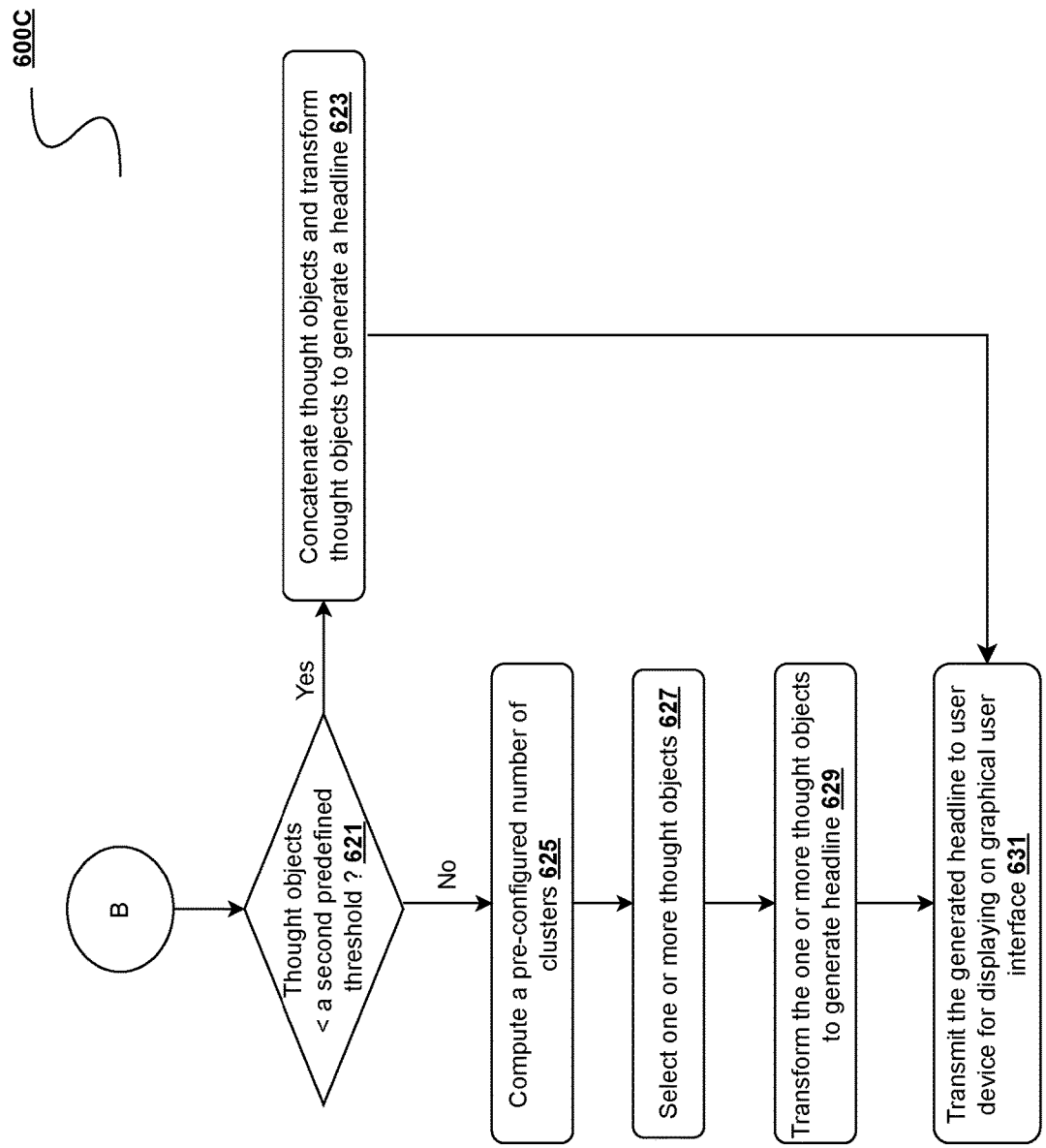

SYSTEM AND METHOD FOR TEXT-TO-TEXT TRANSFORMATION OF QUALITATIVE RESPONSES

CROSS-REFERENCE TO RELATED APPLICATIONS

This application is a continuation of U.S. patent application Ser. No. 18/483,960, titled, "SYSTEM AND METHOD FOR TEXT-TO-TEXT TRANSFORMATION OF QUALITATIVE RESPONSES" filed on Oct. 10, 2023. The entire contents of which is hereby incorporated by reference.

BACKGROUND OF THE INVENTION

Field of the Art

The disclosure relates to text-to-text transfer transformation and processing of qualitative responses from a plurality of user devices, and more particularly to the field of selecting and transforming text for the generation of summary for the qualitative responses received from the plurality of user devices.

Discussion of the State of the Art

Typically, when results from a plurality of user participant devices are used to gather input on a subject, two different types of participant responses are elicited: quantitative responses and qualitative responses. A quantitative response is a close-ended response, such as a multiple choice, numeric style, or yes/no response. A qualitative response is an open-ended, comment-style response, where the participant has the freedom to textualize associated ideas and is not constrained by pre-determined answers. Accordingly, eliciting qualitative responses may have substantial benefits over quantitative responses in that qualitative responses can provide more detailed information on participant interests, consisting of areas of alignment, sentiment, or topics, to name a few.

However, there are well-known limitations with understanding, summarizing, and predicting a collective outcome from qualitative responses, as compared to quantitative responses, especially when qualitative responses have uneven lengths (e.g., word-count) and/or are not accompanied by quantitative responses. For instance, multiple qualitative responses, each comprising textual information without numerical data, can be difficult to interpret in order to determine a consensus on the subject at hand. To interpret the textual information from the multiple qualitative response's summarization tools may be used. The summarization tools generate a summary of text received in the qualitative responses. However, with an increasing amount of textual information in the qualitative responses, the summarization tools find it difficult to provide relevant summarization of the qualitative responses. Further, the summarization tools have limitations on the amount of text that can be processed.

Accordingly, a need in the art exists for a system and method for filtering and selecting text for summarization from the qualitative responses.

SUMMARY OF THE INVENTION

In some aspects, the techniques described herein relate to a system for text-to-text transfer transformation, the system including: a transformation computer including a processor, a memory, and a plurality of programming instructions, the plurality of programming instructions when executed by the processor cause the processor to: receive a plurality of thought objects, the thought objects including qualitative responses; responsive to a requested length a summary and a number of thought objects being above respective pre-defined thresholds: compute a reduced plurality of thought objects by reducing the quantity of thought objects included within the plurality of thought objects; calculate a number of clusters to be generated based on a pre-configured length of summary and the number of thought objects in the reduced plurality of thought objects; generate the calculated number of clusters by analyzing a semantic vector representation of thought objects in the reduced plurality of thought objects; select one or more thought objects from the generated clusters for text-to text transfer transformation; transform the selected one or more thought objects to generate a summary of the qualitative responses in the received plurality of thought objects; and transmit the summary to a user device, wherein the summary is displayed on a graphical user interface associated with the user device.

In some aspects, the techniques described herein relate to a system, wherein to compute the reduced plurality of thought objects the plurality of programming instructions when executed by the processor, further cause the processor to: identify one or more thought objects from the plurality of thought objects as redundant thought objects, wherein the redundant thought objects are identified based on information present in the thought objects; and remove the identified redundant thought objects from the plurality of the thought objects to compute the reduced plurality of thought objects.

In some aspects, the techniques described herein relate to a system, wherein to compute the reduced plurality of thought objects, the plurality of programming instructions when executed by the processor, further cause the processor to: determine whether the total number of sentences in the plurality of thought objects is above the pre-defined sentence threshold; and responsive to the total number of sentences in the plurality of thought objects being above the pre-defined sentence threshold, generate a random sample from the reduced plurality of the thought objects.

In some aspects, the techniques described herein relate to a system, wherein to generate the clusters from the reduced plurality of thought objects, the plurality of programming instructions when executed by the processor, further cause the processor to associate a cluster, of a first plurality of clusters, to at least a portion of thought objects of the reduced plurality of thought objects.

In some aspects, the techniques described herein relate to a system, wherein the plurality of programming instructions when executed by the processor, further cause the processor to select the one or more objects from each of the generated cluster using one or more confidence scores, a thought object theming process, a thought object sentiment analysis process, a thought object rating process, or a combination thereof.

In some aspects, the techniques described herein relate to a system wherein the confidence scores are indicative of a quantified importance of each thought object.

In some aspects, the techniques described herein relate to a system, wherein the plurality of instructions when executed by the processor, further cause the processor to, responsive to determining that the requested length of the summary and the number of thought objects are below the respective pre-defined thresholds, generate a headline for the received plurality of thought objects.

In some aspects, the techniques described herein relate to a system, wherein to generate the summary of the plurality of instructions when executed by the processor, further cause the processor to create a summary with a neural abstractive summarizer.

In some aspects, the techniques described herein relate to a computer implemented method for text-to-text transformation, the method including: receiving, by a text transformation computer a plurality of thought objects; responsive to a requested length of the summary and a number of thought objects being above the respective pre-defined thresholds: computing a reduced plurality of thought objects by reducing the quantity of thought objects included within the plurality of thought objects; calculating a number of clusters to be generated based on a pre-configured length of summary and the number of thought objects in the reduced plurality of thought objects; generating the calculated number of clusters by analyzing the semantic vector representation of thought objects in the reduced plurality of thought objects; selecting one or more thought objects from the generated clusters for text-to-text transformation; transforming the selected one or more thought objects to generate a summary of the qualitative responses in the received plurality of thought objects; and transmitting the summary to a user device, wherein the summary is displayed on a graphical user interface associated with a user device.

In some aspects, the techniques described herein relate to a method, wherein the computation of the reduced plurality of thought objects includes the steps of: identifying one or more thought objects from the plurality of thought objects as redundant thought objects, wherein the redundant thought objects are identified based on information present in the thought objects; and removing the identified redundant thought objects from the plurality of the thought objects to compute the reduced plurality of thought objects.

In some aspects, the techniques described herein relate to a method, wherein the computation of the reduced plurality of thought objects further includes the steps of: determining whether the total number of thought objects in the plurality of thought objects is above a maximum thought threshold; and responsive to the plurality of thought objects being above the pre-defined maximum thought threshold, generating a random sample from the reduced plurality of the thought objects.

In some aspects, the techniques described herein relate to a method, wherein the generation of the clusters in the reduced plurality of thought objects, includes associating a cluster, of a first plurality of clusters, to at least a portion of thought objects of the reduced plurality of thought objects.

In some aspects, the techniques described herein relate to a method, wherein the method further includes analyzing the semantic vector representation from each cluster using one or more confidence scores, a thought object theming process, a thought object sentiment analysis process, a thought object rating process, or a combination thereof.

In some aspects, the techniques described herein relate to a method wherein the confidence scores are indicative of a quantified importance of each thought object.

In some aspects, the techniques described herein relate to a method, wherein the method further includes the steps of: determining whether the requested length of summary and the number of thought objects in the plurality of thought objects are below the respective pre-defined thresholds; responsive to determining that the requested length of summary and the number of thought objects are below the respective pre-defined thresholds, generating a headline for the received plurality of thought objects.

In some aspects, the techniques described herein relate to a method, wherein the summary is generated using a neural abstractive summarizer.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

FIG. 6C is a flow diagram illustrating a method of text-to-text transfer transformation for generating a headline from a plurality of thought objects, according to a preferred embodiment of the invention;

DETAILED DESCRIPTION

Figure 1:
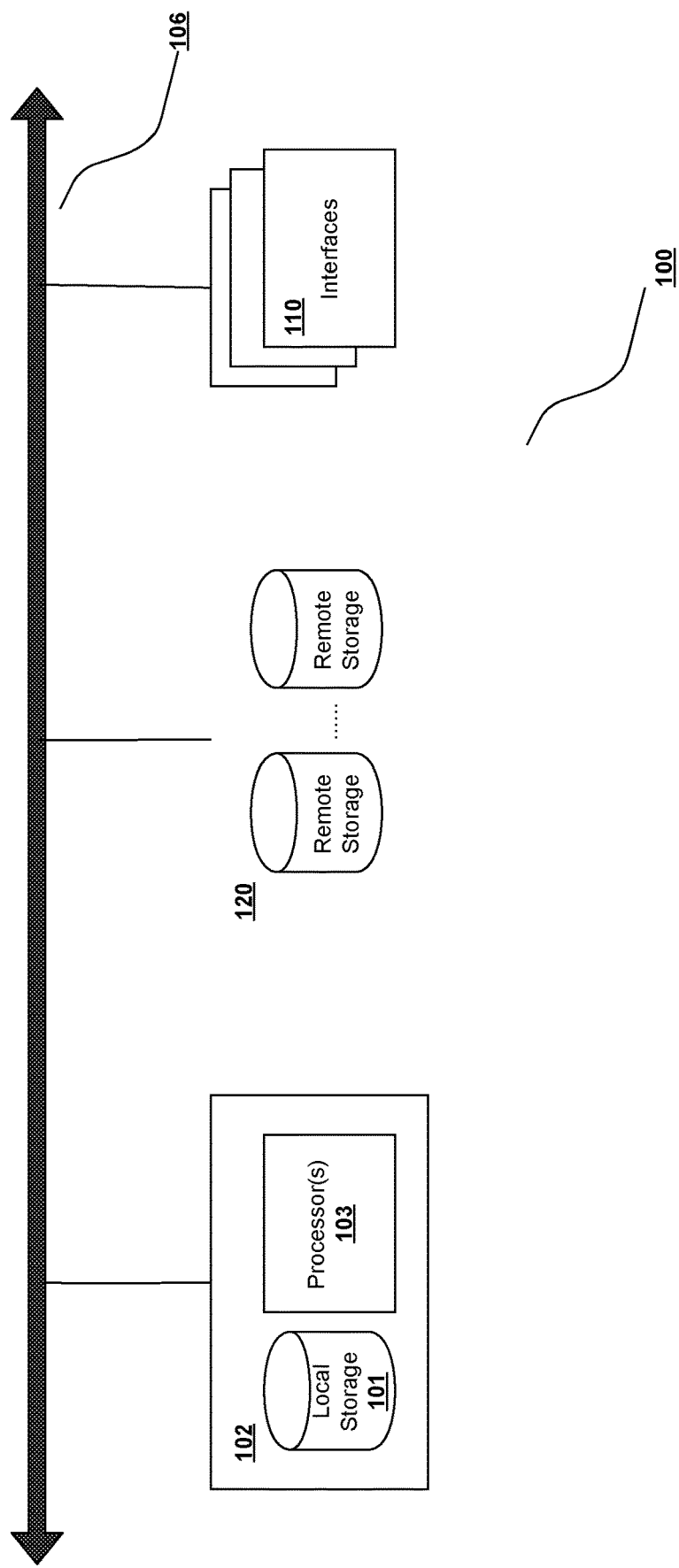
FIG. 1 is a block diagram illustrating an exemplary hardware architecture of a computing device used in an embodiment of the invention.

The inventor has conceived and reduced to practice, a system and method for abstractive summarization of a selection of a plurality of thought objects for distribution to a plurality of user devices, whereby the plurality of qualitative responses associated with the plurality of thought objects are unpredictably received form a plurality of user devices in a communication environment.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical, and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to fully illustrate one or more aspects of the inventions. Similarly, although process steps, method steps, algorithms or the like may be described in sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

A priority value, as referred to herein, is a response received from a user device and may be a numeric scale represented by integers, representations, and is some embodiments, a graphical representation of the numeric scale, a normalized plurality of numbers (such as a Likert scale or a zero-centered scale) or the like. In some embodiments, a zero-priority value is a value usable by the system. In some embodiments, the scale is normalized, in other embodiments, the scale is a standard scale that may or may not include negative values. In other embodiments, a priority value scale may be a plurality of graphical elements indicating a spectrum of dislike to like, interest or sentiment level, or the like). In some embodiments, graphical scales are converted to numeric scale for calculation purposes.

In some embodiments, assigned, as referred to herein, for example, with respect to a participant object 575 assigning a priority value to a thought object 510, may refer to priority values that may have been received by device 520 and associated with a thought object 510, the thought object associated to participant object 520.

Rating, as referred to herein, may be a priority value response received from device 515 associated with participant object 575. Ratings may be a numeric value on a scale indicating a range of possible responses available to assign to thought object 510.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer programming instructions stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more specifically designed computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, a block diagram depicting an exemplary computing device 100 suitable for implementing at least a portion of the features or functionalities disclosed herein is shown. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local storage 101 and/or remote storage 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
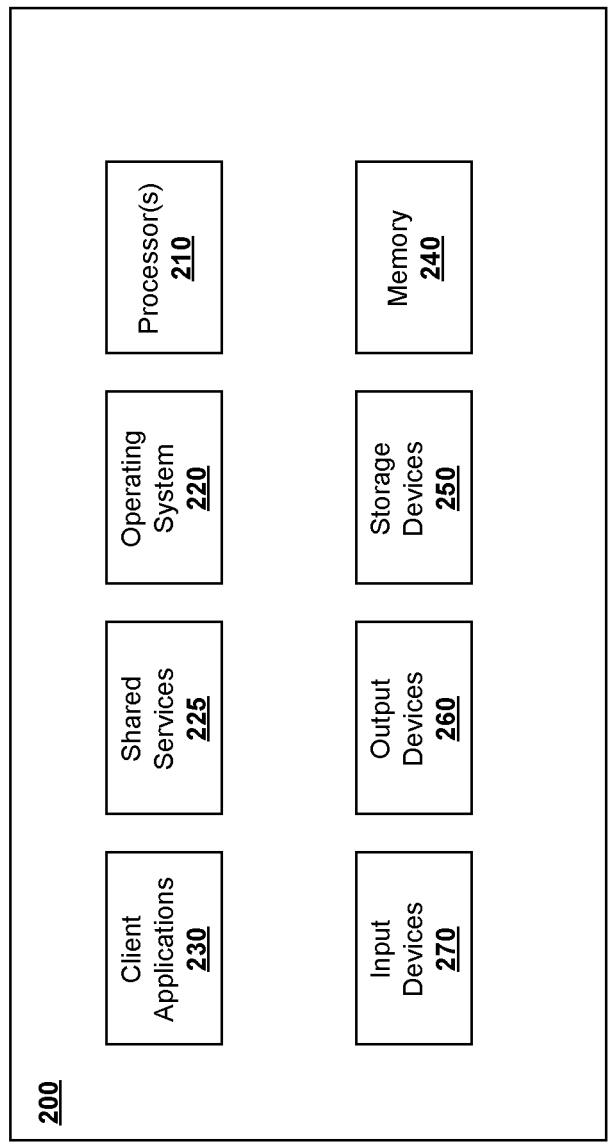
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as, for example, a client application 230. Processors 210 may carry out computing instructions under the control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Shared services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
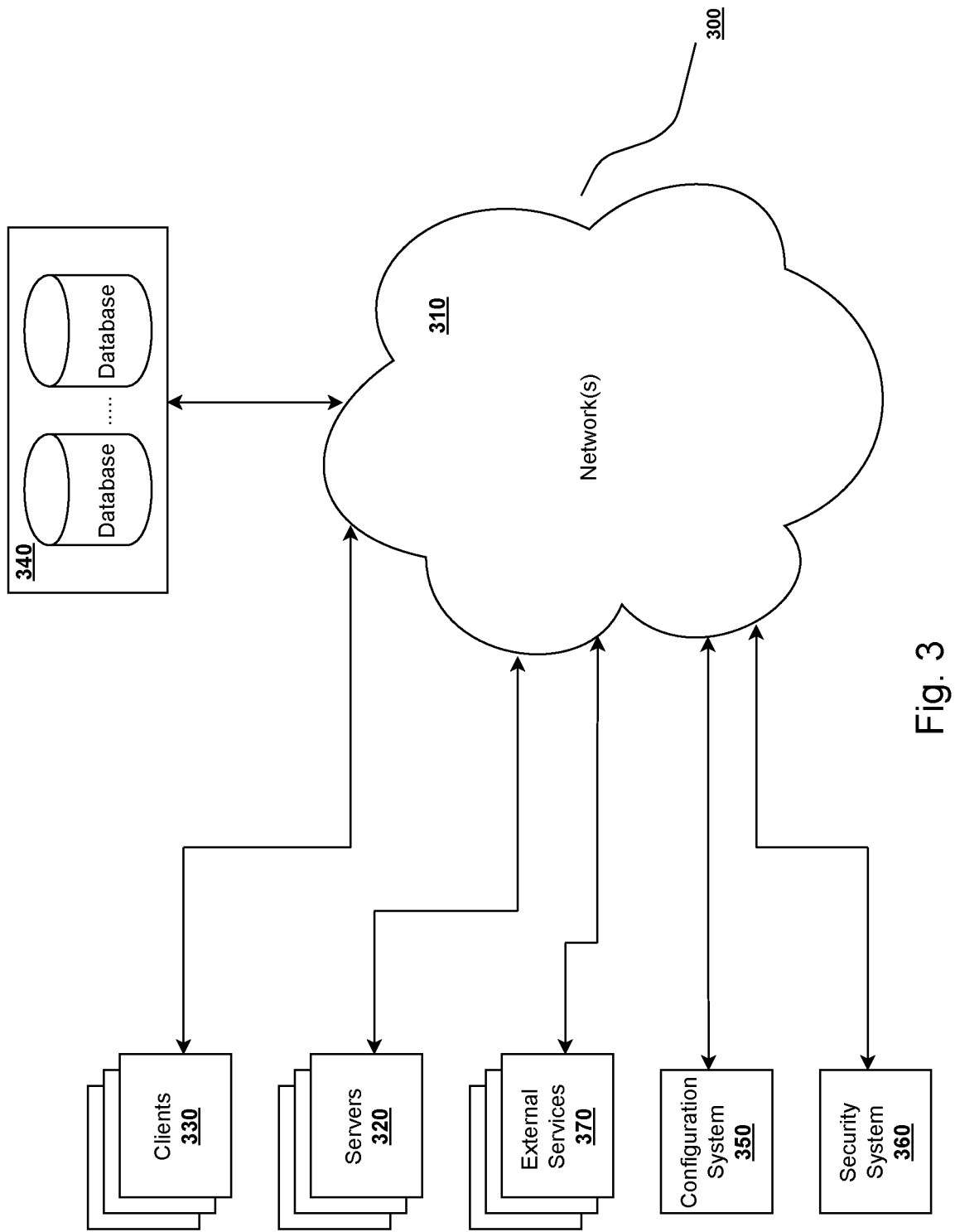
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprises or user's premise.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
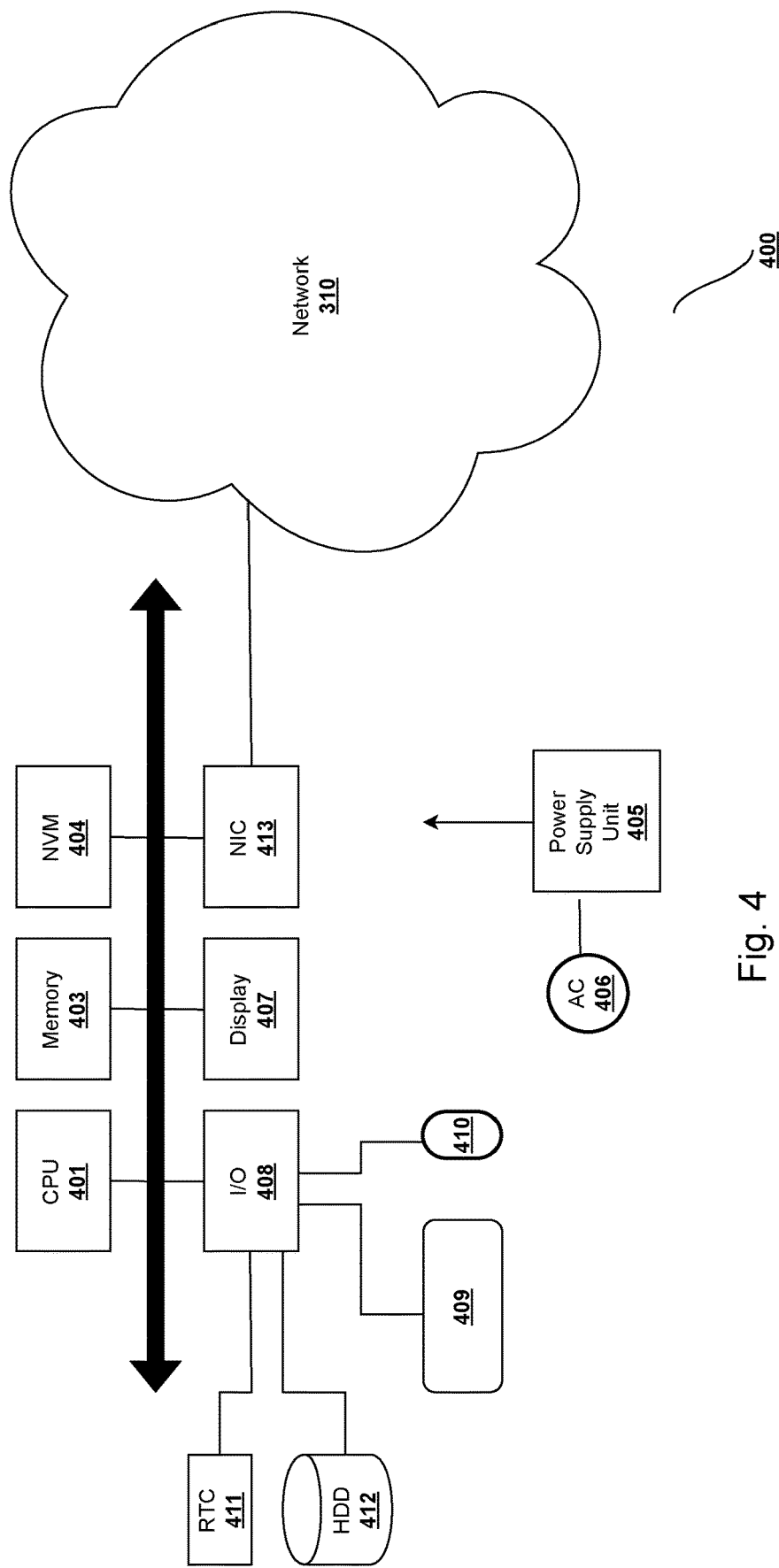
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but do not apply to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5A:
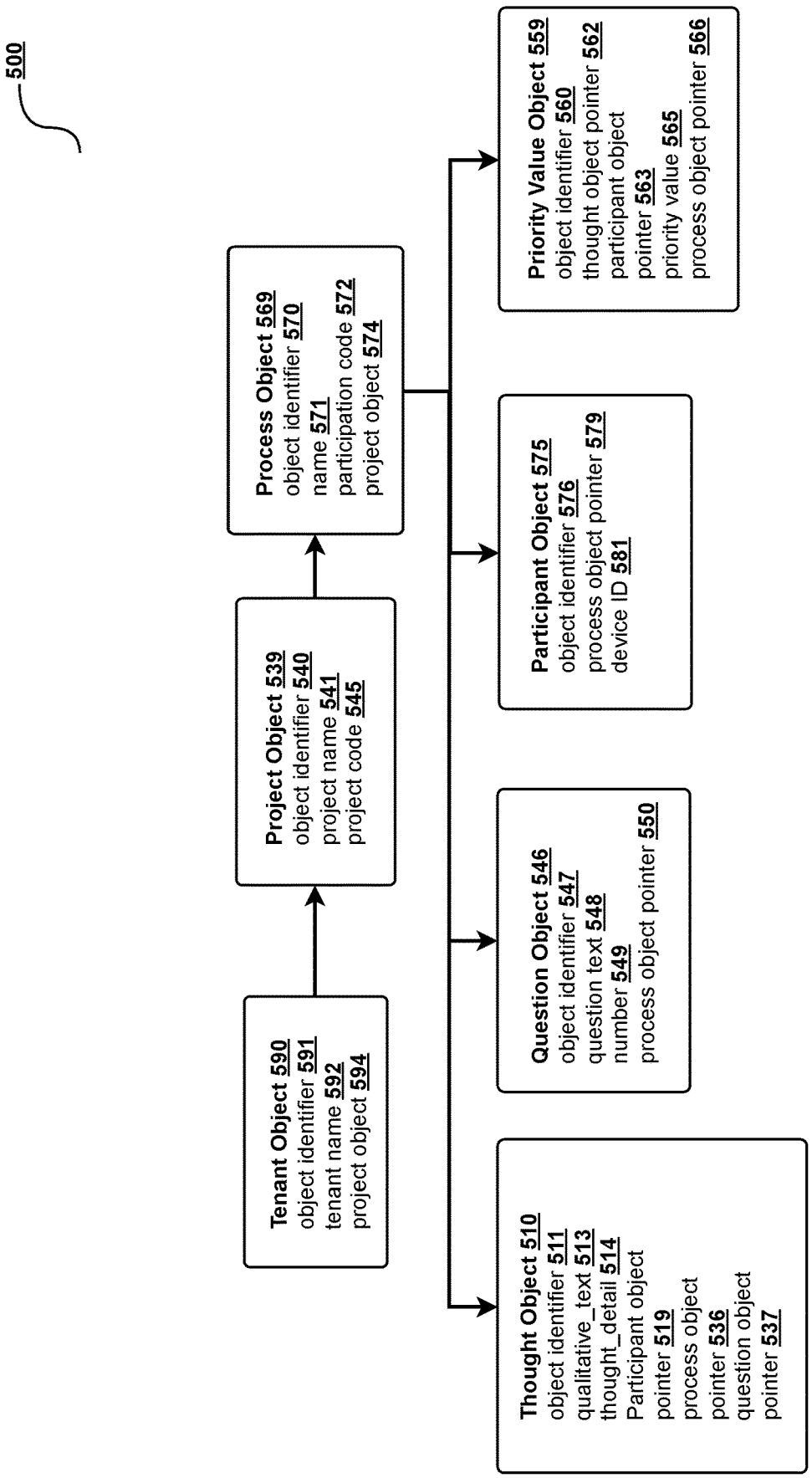
FIG. 5A depicts a plurality of objects used while transforming the text received in the qualitative responses, according to a preferred embodiment of the invention.

FIG. 5A is a block diagram illustrating a plurality of objects used while transforming the text received in the qualitative responses, according to a preferred embodiment of the invention. According to the embodiment, a plurality of programming instructions stored in memory 240 that when executed by at least one processor 210 comprise a plurality of objects that may comprise data, in the form of fields, often known as attributes and programming instructions, in the form of procedures, often known as methods. Objects 500 may be arranged such that procedures can access and often modify one or more data fields of an associated object. In various embodiments, programming instructions enable objects to interact with one another. In a preferred embodiment, objects 500 may be implemented in an object-relational database management system, for example, PostgreSQL and the like.

Accordingly, it can be appreciated that an understanding of a plurality of thought objects 510 received from a plurality of user devices 522 (refer to FIG. 5B) provides a means for large-scale involvement of users via devices 520 in a networked environment to participate in a quantitative fashion to evaluate thought objects that require an understanding of interest regardless of device location, temporal displacement (i.e. when the respondents responded), psychology (willingness to provide responses in an open forum, or requirement for anonymity), and the like. An interest categorization may represent a collective understanding of what may be most important to at least a portion of a group of users associated to devices 520, for example, across dispersed groups such that understanding of concepts from the plurality of user devices 522 by a plurality of users.

Figure 5B:
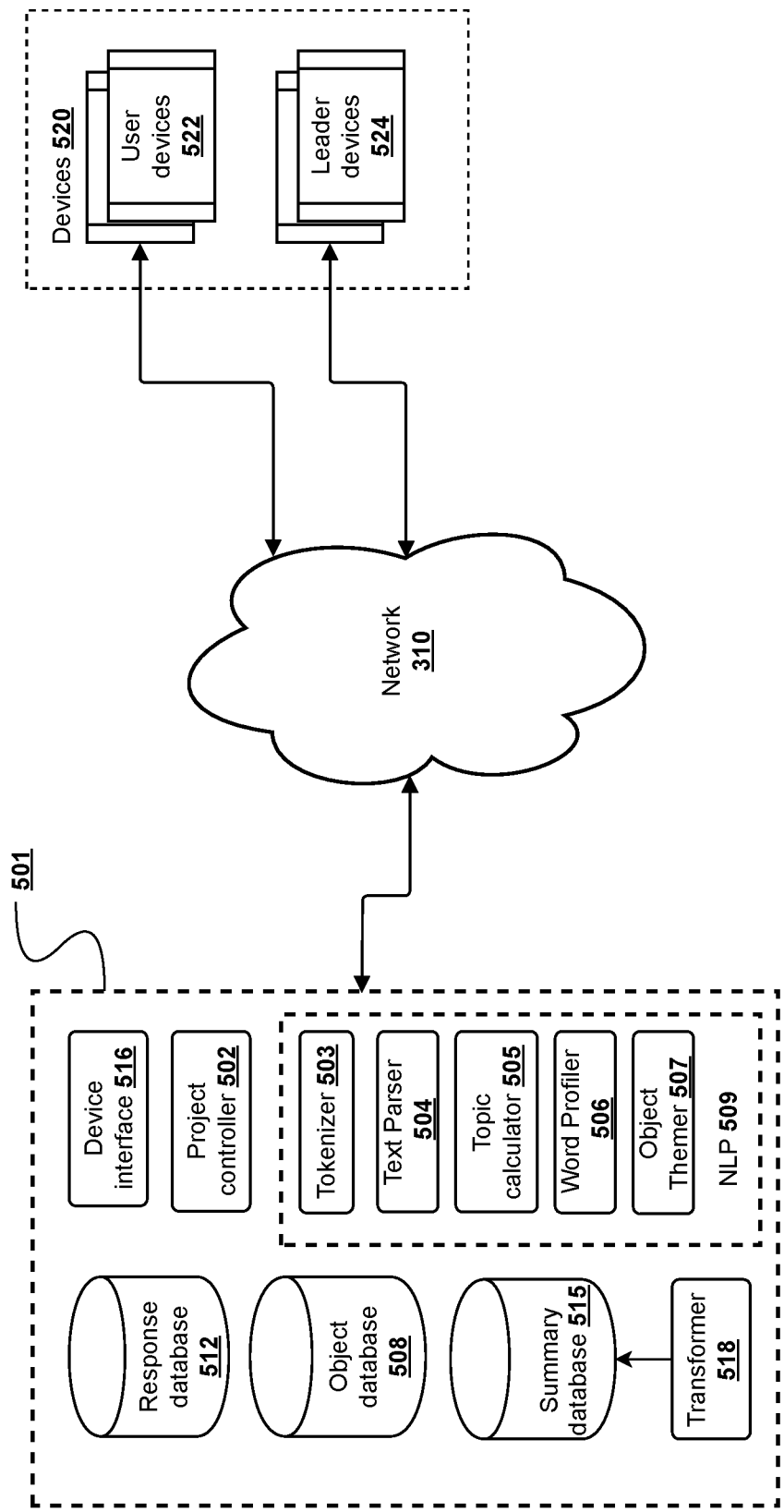
FIG. 5B is a block diagram illustrating an exemplary conceptual architecture of transformation computer, according to a preferred embodiment of the invention.

Tenant object 590 may be a plurality of programming instructions stored in memory 240 that when executed by one or more processors 210 describe a tenant of a system shown in FIG. 5B, that is, a configured entity that may execute a plurality of projects described by one or more associated project objects 539 for analysis of one or more thought objects 510 received from a plurality of user devices 522. Accordingly, one or more project objects 539, that are associated to tenant object 590, are connected by project object pointer 594. In a preferred embodiment, tenant object 590 may comprise: an object identifier 591 whereby each instantiation of tenant object 590 may be referred to uniquely within the system; tenant name 592 may be a text description of the instant tenant object 590; project object pointer 594 (described above) comprises one or more pointers to one or more project objects 539. Said differently, the system may configure multiple tenant objects 590 whereby each tenant object 590 may be associated to a plurality of project objects 539 whereby each associated project object 539 is associated to a plurality of other objects to enable an analysis of qualitative patterns for a plurality of priority values received from a plurality of user devices 522 (referring to FIG. 5B). It should be appreciated that user devices 522 may be at least a portion of devices 520. In a preferred embodiment, user devices 522 may be devices that, through network 310, provided responses to, for example, question object 546 and/or thought objects 510. In some embodiments, leader devices 524 may be considered user devices 522.

Project object 539 may be a plurality of programming instructions stored in memory 240 that when executed by processors 210 describe a project for an analysis of a plurality of thought objects 510 received from a plurality of user devices 522, whereby a project may be a planned collaborative execution of the methods described herein utilizing one or more specially programmed components. Project object 539 may comprise: object identifier 540 which may be a globally unambiguous persistent identifier representing an instance of project object 539; project name 541 may be textual description of the instance of project object 539; project code 545 may be unique identifier associated to project object 539. Thought object 510 may be a plurality of programming instructions stored in memory 240 that when executed by processors 210 comprise an arrangement of information in the form of ideas received from devices 520.

Thought object 510 received from devices 520 may comprise: object identifier 511 which may be a globally unambiguous persistent identifier representing an instance of thought object 510; qualitative_text 513 may be an arrangement of information corresponding to a qualitative response from a participant device 522 to another arrangement of information in the form of an open-ended question from, for example, a question object 546; thought_detail 514 may be an additional arrangement of information corresponding to an additional qualitative response from participant device 522, for example, an explanation of the importance of the qualitative response represented by qualitative_text 513; participant object pointer 519 is a pointer to participant object 575 that shared the instant thought object 510; process object pointer 536 may be a pointer to an associated process object 569; question object pointer 537 may be a pointer to an associated question object 546 to, for example, have access to an question object 546 through its memory address instead of, for example, a new object being created on a stack.

Question object 546 may be a plurality of programming instructions stored in memory 240 that when executed by processors 210 comprise details around the associated arrangement of information associated to a corresponding an open-ended question by, for example, as configured by a leader device 524 (also referred to herein as facilitator device), the arrangement of information being a point of origination for which a plurality of thought objects 510 results, are distributed by project controller 502, and for which a plurality of priority value responses are solicited from at least a portion of devices 515 to perform an analysis of qualitative patterns. Question object 546 may comprise, at least: object identifier 547 which may be a globally unambiguous persistent identifier representing an instance of question object 546; question text 548 may be an arrangement of information comprising textual description in the form of an open-ended question; number 549 may be an additional unique identifier for the instant question object 546 that may indicate an index of the instant question in a sequence or series of related question objects in a project object 539; process object pointer 550 may be a pointer to an associated process object 569, for example, to have access to the process object 569 through its memory address instead of a new object being created on a stack.

Process object 569 may be a plurality of programming instructions stored in memory 240 that when executed by processors 210 comprise an object describing a process corresponding to project object 569 for an analysis of qualitative patterns. A process may provide a procedure for how a project is to be executed, for example, how question object 546 may be distributed, how thought objects 510 are received and processed, and the like. Process object 569 may comprise: object identifier 570 which may be a globally unambiguous persistent identifier representing an instance of process object 569; name 571 which may be textual description of the instance of the process object 569; participation code 572 may be an additional unique identifier associated to the instant process object 569; project object pointer 574 may be a pointer to a corresponding project object 539 to, for example, have access to project object 539 through its memory address instead of a new object being created on a stack.

Participant object 575 may be a plurality of programming instructions stored in memory 240 that when executed by processors 210 comprises an object to describe a participant associated with a user device 522 (that is, each participant object corresponds to a corresponding device 522). In some embodiments, participant objects 575 may be assigned to devices 520 that have participated (provided one or more thought objects 510 in response to a question object 546). Participant object 575 may comprise, at least: object identifier 576 which may be a globally unambiguous persistent identifier representing an instance of participant object 575; process object pointer 579 may be a pointer to an associated process object 569 to, for example, have access to the process object 569 through its memory address instead of a new object being created on a stack; project object pointer 579 may be a pointer to a project object 539 to, for example, have access to project object 539 through its memory address instead of a new object being created on a stack; device ID 581 identifies an associated device 560. It should be noted that, in a preferred embodiment, a tenant object 590 may represent properties and methods corresponding to a user, or group of users, of the system (for example, a company, organization, or the like). Each tenant object 590 may be associated to one or more project objects 539 that may provide details around a project for exchanging information following one or more processes associated to one or more process objects 569 whereby at least one question object 546 and a plurality of thought objects 510 describe an interaction by devices 515 (at least a portion of which are associated to user objects 522).

FIG. 5B is a block diagram illustrating an exemplary conceptual architecture of a transformation computer 501 comprising a plurality of components and each comprising at least a plurality of programming instructions, the programming instructions stored in memory 240 that when executed by one or more processors 210, cause one or more processor 210 to perform operations disclosed herein.

Transformation computer 501 may receive a plurality of connections via network 310 from a plurality of devices 520 which may comprise user devices 522 and leader devices 524 for exchanging question objects 546, thought objects 510, and other information. Leader devices 524 may compose and configure a project object 539 associated with one or more question objects 546 to solicit a plurality of thought objects 510 based on an arrangement of information in the form of an open-ended free-flow text that may be in the form of one or more questions. In a preferred embodiment, leader devices 517 may initiate and manage a project (as defined in project object 539 that comprises one or more question objects 546 via a process defined in process object 569) and at least a portion of user devices 522. Transformation computer 501 may receive thought objects 510 containing qualitative responses from one or more devices 520. User devices 522 that respond to the question objects with thought objects 510 may also be referred to as participant devices 522. In some embodiments, a leader device 524 may be considered as user device 522 and may act as both leader device 524 and user device 522. The devices 520 may be similar to the computing system 400 described in FIG. 4.

Device interface 516 may manage input/output communications to devices 520, and in some embodiments, to response database 512, over network 310. Project controller 502 may manage execution of an exchange of thought objects 510, whereby project controller 502 may manage receiving and distributing question objects 546 to devices 520, and receiving and distributing priority value objects via device interface 516. In some embodiments, project controller 502 may process methods disclosed herein.

Response database 512 may store the received plurality of thought objects 510 from the plurality of devices 520. The plurality of thought objects 510 may include qualitative responses provided by the user. In some embodiments, the response database 512 holds just priority value responses while in others, priority value responses are held in priority value objects 559. Object database 508 may provide database storage for objects 500, both pre-configured and objects with assigned data fields. Summary database 515 may store the summaries generated by transformer 518 for the received thought objects 510.

In a preferred embodiment, a question object 546 is received at project controller 502 from leader device 524. Question object 546 may then be distributed, by project controller 502 to at least a portion of a plurality of devices 520, subsequently, a plurality of thought objects 510 may be received from at least a portion of the plurality of devices 520. It should be appreciated that question objects 546 when received from leader device 524, the objects and associated parameters may be stored in object database 508 or some other data storage location. Similarly, thought objects 510 received from at least a portion of the plurality of devices 520 may be stored in object database 508.

It should be appreciated that question object 546 and at least a portion of the plurality of thought objects 510 (and other associated objects) may be associated to at least one project object 539. In a preferred embodiment, a tenant object 590 may have one or more associated project objects 539, that is, a tenant may perform a plurality of mutually exclusive projects (also referred to herein as an exchange or communication exchange) to understand the dynamics and behaviors of a plurality of users via data received from a plurality of devices 520. Though in a preferred embodiment, projects are self-contained in nature (in terms of analyses that may be performed), it should be appreciated that in some embodiments, projects may be interrelated, and calculations by system 500, may be performed across a plurality of projects.

The received plurality of thought objects 510 may be analyzed by Natural Language Processing (NLP) components 509 components such as tokenizer 503, text parser 504, topic calculator 505, and word profiler 506, and object themer 507. NLP components 509 may be used by transformation computer 501 to process the text (e.g., qualitative text 513) present in the received plurality of thought objects 510 and extract thought objects for transformer 518.

In a preferred embodiment, tokenizer 503 segregates at least a portion of text, for example, as received in thought objects 510. Tokenizer 503 may further separate the segregated at least portion of text into tokens, such that these tokens can be further processed. In an example, a tokenizer library (for example, Natural Language Toolkit (NLTK)) may be used to tokenize thought object 510, that is, assign a token to each word.

According to some embodiments, each thought object 510 must meet certain criteria in order to qualify for inclusion into a filter and select computation, wherein such qualification may at least include a determination, by project controller 502, whether after the removal of stop words and punctuations from a given thought object 510, any token (as described below) remains for further analyses. If no such token may remain for analysis, such thought object 510 may not be included in the analysis by project controller 502.

In a preferred embodiment, text parser 504 aggregates text, for example as received within qualitative_text 513 and/or thought_detail 514 associated to thought object 510. The qualitative responses received in thought objects 510 may be used for text-to-text transformation. Text parser 504 may aggregate text across one or more thought objects 510. Text parser 504 may work with tokenizer 503 and receives tokens for a plurality of words in the received thought objects 510. In an embodiment, text parser 504 may remove words from thought object 510 whereby the stop words may be pre-configured in a list. Accordingly, the tokens associated to the stop list words may be removed, by text parser 504, from thought object 510. Further, text parser 504 may stem the tokens by shortening words to their root value by a process of reducing inflected (or sometimes derived) words to their word stem, base or root form using a stemming program, stemming algorithm, or other stemmer techniques known in the art.

In a preferred embodiment, topic calculator 505 generates a matrix vector (T×N) with the best number of topics (bestNumTopics) identified by topic calculator (T) 505 and the number of thought objects (N). In an embodiment, the value for bestNumTopics may be determined, by project controller 502, by executing a topic modeling approach for a specified range of a number of topics. The minimum number of topics and the maximum number of topics, of the range of topics, may be determined by project controller 502 by utilizing a number of thought objects 510, which do not exceed a pre-configured number of topics (e.g., 15 topics). In an embodiment, project controller 502 may run a topic modeling approach multiple times per number of total such topics. In an example, the project controller 502 may run topic modeling approach three times per number of total such topic.

In a preferred embodiment, word profiler 506 creates dictionaries and word sets. The word set may include stop words (that is, words that may provide no semantic significance and may generally filtered out). In an embodiment, word profiler 506 may use pre-configured stop words and save them in a stopWords word set. Similarly, word profiler 506 may fill a dictionary to include one or more words received from devices 520. This dictionary may be stored in a database.

Word profiler 506 may convert the aggregated text to lower case and may remove links from the aggregated text. The links, in an embodiment, may be hyperlinks to a webpage and/or links to other text in a document. Further, word profiler 506 may remove punctuation and extra spaces from the aggregated text. In an embodiment, word profiler 506 may be used for identifying sentences and the number of words present in the plurality of thought objects 510.

During operation, transformation computer 501 communicates with NLP components 509 for extracting and classifying thought objects 510 for transformer 518. Transformation computer 501 may reduce the number of thought objects 510 by removing redundant thought objects to generate a reduced set of thought objects. The remaining reduced plurality of thought objects 510 may be associated with themes using NLP components 809. Text parser 504 may generate an array of stemmed tokens from thought objects 510. Object themer 507 creates a list of all unique stems across at least a portion of thought objects 510. Object themer 507 may associate the unique stems to existing themes. Based on semantic vector representation of thought objects 510, project controller 502 may identify the themes and cluster the reduced plurality of thought objects into themes. As the clustering is performed to the reduced plurality of thought objects 510, the computation power requirements for transformation computer 501 may reduce. The process of calculating the reduced plurality of thought objects 510, generation of clusters, and the selection of one or more thought objects for summarization is described in detail in FIGS. 6-8.

In a preferred embodiment, object themer 507 may be used by methods disclosed herein to generate a table of thought objects 510 that may have associated themes. The table may identify the reduced plurality of thought objects 510, that are associated with one or more themes. Object themer 507 may parse thought objects and extract stems for tokens left after the removal of stop words. Using a preferred number of themes, project controller 502 may create and/or identify themes from the reduced plurality of thought objects 510. The process of associating themes to the reduced plurality of thought objects 510 is described in detail in FIG. 8. Topics may be identified from the qualitative_text 513 and thought_detail 514 associated with the thought objects 510.

In a preferred embodiment, transformer 518 receives a selected one or more thought objects 510 from project controller 502. Transformer 518 may generate a summary of the selected one or more thought objects 510. In an embodiment, transformer 518 is a neural abstractive summarizer. The summary generated by transformer 518 is stored in summary database 515. Each summary generated may be associated with a leader device 524 from where the question object 546 is received. Further, the summary generated may be transmitted and displayed on a graphical user interface of user device 522.

Detailed Description of Exemplary Embodiments

Figure 5C:
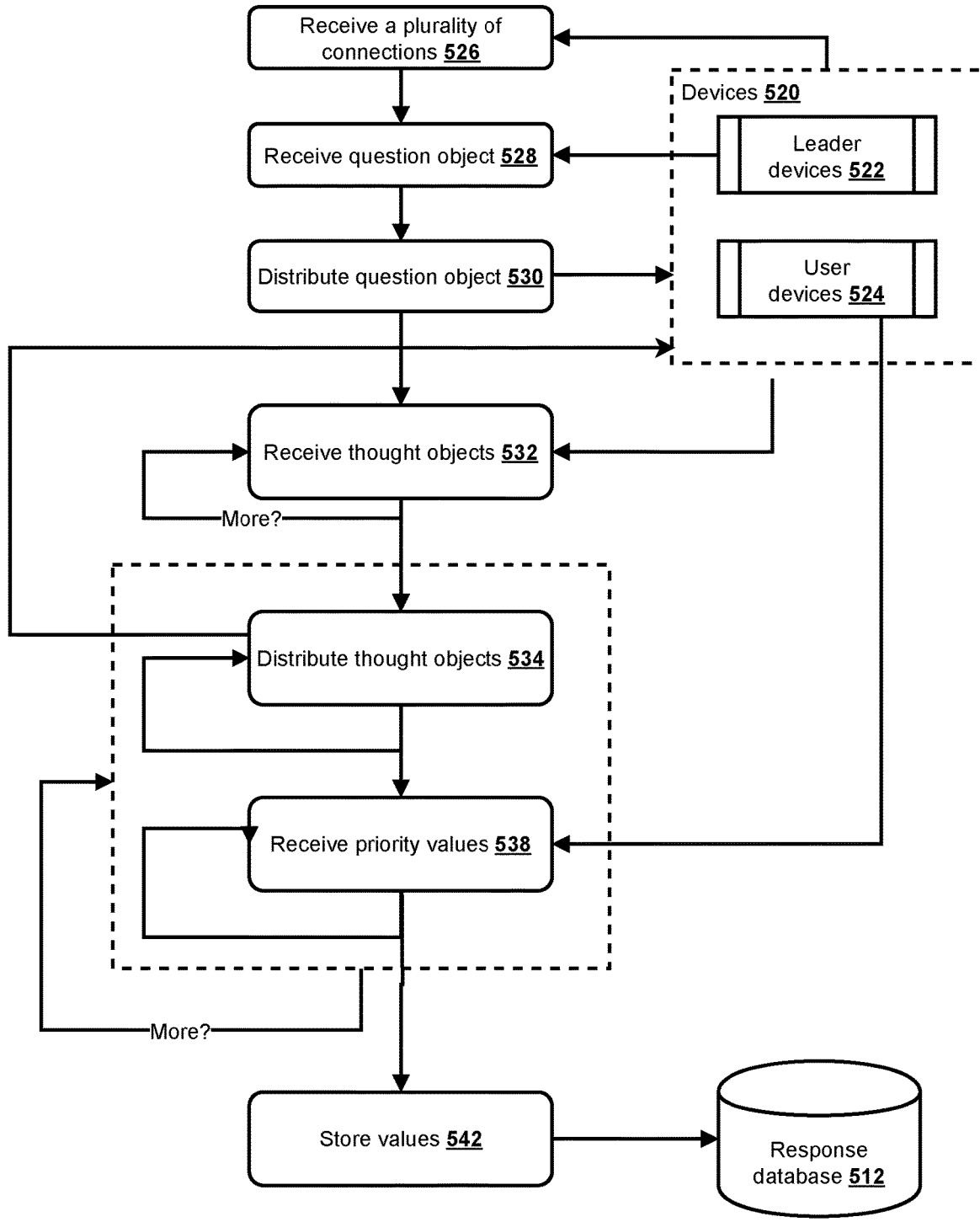
FIG. 5C is a flow diagram illustrating a method for conducting a process to solicit thought objects and priority value responses from a plurality of devices, according to a preferred embodiment of the invention.

FIG. 5C is a flow diagram illustrating method 555 for conducting a process to solicit thought objects 510 and priority value responses from a plurality of devices 520, according to a preferred embodiment of the invention. According to the embodiment, in a first step 526, a plurality of connections from a plurality of devices 520 are received via network 310 at device interface 516 to enable communication between transformation computer 501 and connected devices 520 and, in some embodiments, a remote response database 512.

In a next step 528, a question object 546 is received, by project controller 502, from a first leader device 524 via device interface 516 to begin a process to solicit thought objects 510 and priority value responses. It should be appreciated that question object 546 may be associated with a previously configured project object 539 and belong to a tenant object 590. Question object 546 may comprise an arrangement of information comprising open-ended free-form text arranged in a manner whereby responses from at least a portion of user devices 522 may be solicited (for example, arranged in the form of a question), the expected responses comprising a plurality of thought objects 510. In a next step 530, project controller 502 may distribute question object 546 to at least a portion of devices 520 via device interface 516 on network 310.

In a next step 532, a plurality of thought objects 510 may be received by at least a portion of devices 520, the plurality of thought objects 510 each comprising, at least, an qualitative response, the arrangement of information comprising open-ended free-form text arranged in a manner whereby responses from at least a portion of user devices 522 may be solicited, the expected responses comprising a plurality of priority value objects 559, each priority value object 559 comprising priority value 565 comprising a priority value associated to a thought object (for example thought object 562 may associate priority value 565 to a corresponding thought object 510). Further in step 524, topic calculator 505 calculates a plurality of topic vectors in a topic table, each topic vector associated with a thought object 510 of the plurality of thought objects 510. In a next step 534, the plurality of thought objects 510 may be distributed, by project controller 502, to at least a portion of user devices 522 via device interface 516 over network 310 to one or more devices 520. In a next step 538, project controller 502 may receive a plurality of priority value objects 559 (herein also referred to as priority value responses) from at least a portion of devices 520, the plurality of priority value responses each associated to a corresponding thought object 510 (as described previously), the at least portion of responding devices, herein referred to as user devices 522, each priority value response associated to a corresponding thought object 510 and a corresponding user device of user devices 522. In a next step 542, project controller 502 may store the plurality of thought objects 510 and associated priority value responses in response database 512 (in some embodiments, project controller 502 may store the plurality of thought objects 510 and associated priority value responses in response database 512 via network 310).

Figure 6A:
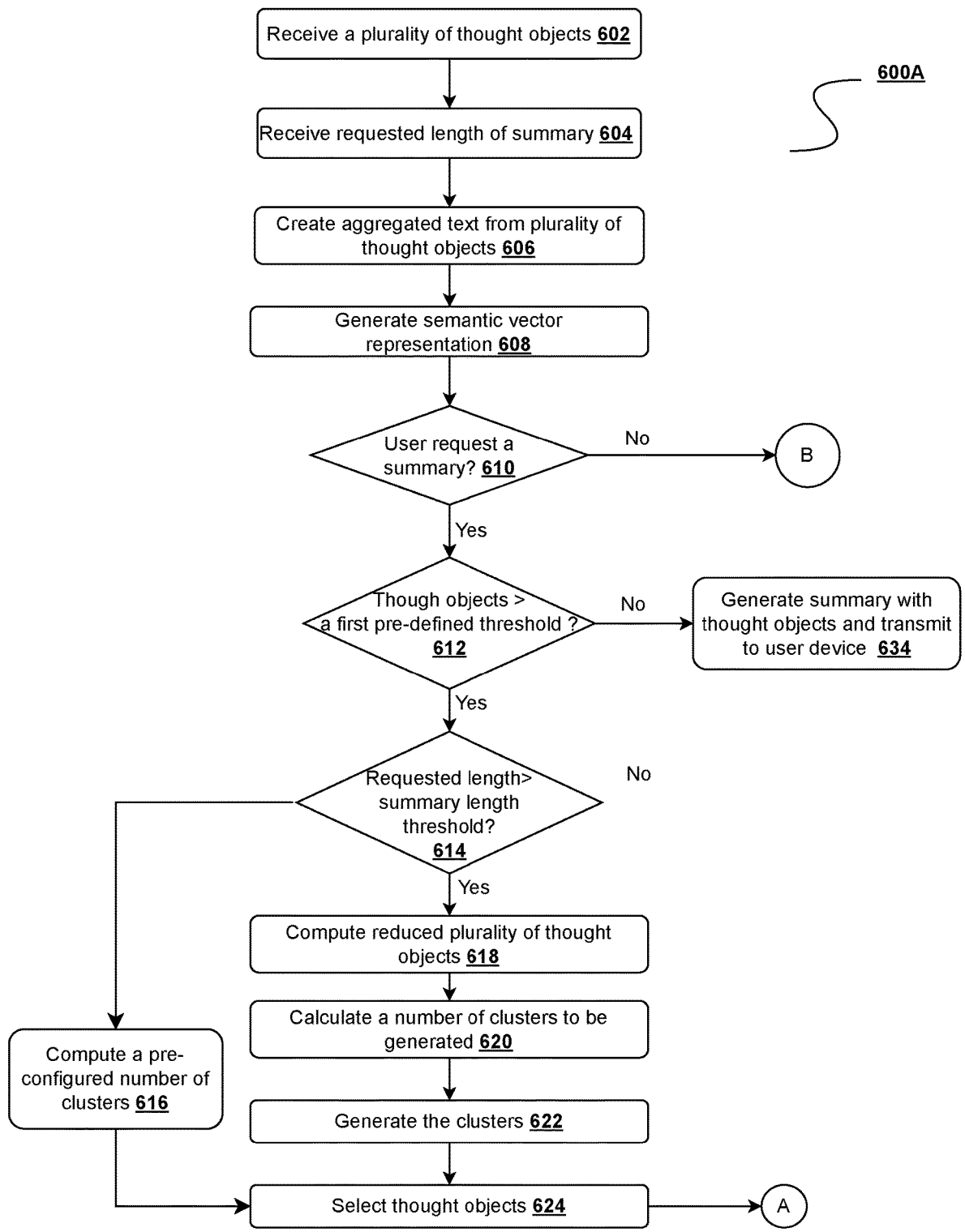
FIG. 6A is a flow diagram illustrating a method of text-to-text transfer transformation for generating a summary from a plurality of thought objects, according to a preferred embodiment of the invention.

FIG. 6A illustrates an exemplary method 600A for text-to-text transfer transformation for generating a summary from a plurality of thought objects 510 using transformation computer 501, according to a preferred embodiment of the invention.

According to an embodiment, in the first step 602, transformation computer 501 may receive a plurality of thought objects 510 from devices 520, including, for example, user devices 522 and leader device 524. It should be understood that the leader device is another user device. In an embodiment, the received plurality of thought objects 510 may be received by transformation computer 501 over network 310 and may be stored in object database 508. In some embodiments, the plurality of thought objects 510 may comprise a themed plurality of thought objects processed by theming methods disclosed herein (referring to FIG. 8)

In step 604, transformation computer 501 may receive a requested length of summary from a user device 522. In an embodiment, a leader device 524 may provide the requested length of the summary. In an embodiment, the minimum length of the summary may include 20 words and the maximum number of words in the summary may include 150 words for generating a summary of the quantitative responses present in the received plurality of thought objects 510.

In step 606, text parser 504 may create aggregated text from the plurality of thought objects 510. In an embodiment, text parser 504 may aggregate the text from the plurality of thought objects 510. Further, according to an embodiment, text parser 504 may aggregate the plurality of thought objects 510 to generate a plurality of words.

In step 608, text parser 504 may generate a semantic vector representation for the plurality of thought objects. Tokenizer 503 may associate the plurality of words with tokens. The tokens may be processed for identifying the topic and themes present in the plurality of thought objects 510.

At step 610, transformation computer 501 may determine if the user request is related to a summary. At step 610, when the user request is not related to summarization, the user's request may be related to generating a headline. The condition related to generation of headline is described in FIG.

6C. When a user request is related to summarization, then at step 612, transformation computer 501 may determine if the plurality of thought objects is greater than the first pre-defined threshold. If the plurality of thought objects is greater than the first pre-defined threshold method 600A proceeds to step 614. When the plurality of thought objects is not greater than the first pre-defined threshold, then at step 634 a summary is generated using thought objects 510 and transmitted to the one or more user devices 512.

At step 614, when the requested length of the summary is smaller than the summary length threshold, then at step 616, transformation computer 501 computes a pre-configured number of clusters. For example, when a plurality of thoughts is below 50 and the requested length of summary is less than 50, transformation computer 501 may generate only 20 clusters.

At step 614, transformation computer 501 may determine if the requested length of summary is greater than a summary length threshold. The processing of thought objects is based on the number of received thought objects and the requested length of the summary. Summary length threshold and first pre-defined threshold are set by the user and can be modified based on application areas in which summarization is being used.

At step 618, a reduced plurality of thought objects may be computed. When transformation computer 501 receives a plurality of thought objects 510 and the requested length of the summary 510 is more than the summary length threshold, transformation computer 501, computes a reduced plurality of thought objects 510 by reducing the quantity of thought objects 510. The number of thought objects 510 may be reduced by removing redundant thought objects 510. In an embodiment, thought objects 510 with a single word or just an emoticon may be considered of no value and may be removed to generate the reduced plurality of thought objects. The computation of the reduced plurality of thought objects is described in detail in conjunction with FIG. 7.

At step 620, when the requested length of summary is above the summary length threshold and the received plurality of thought objects is above the first pre-defined threshold, transformation computer 501 may calculate the number of clusters that are to be generated. The number of clusters to be generated may be based on pre-configured length of the summary and the number of thought objects 510 in the reduced plurality of thought objects 510. In an embodiment, a ratio between the pre-configured length of the summary to the reduced plurality of thought objects 510 is used for calculating the number of clusters. In another embodiment, the pre-configured length of the summary is compared to the maximum length of the thought objects 510 in the reduced plurality of thought objects 510 to compute the number of clusters.

At step 622, transformation computer 501 generates the calculated number of clusters using the semantic vector representation of thought objects in the reduced plurality of thought objects. Each cluster may be associated with a set of semantically similar thought objects.

At step 624, transformation computer 501 may select one or more objects from the generated clusters based on a confidence score, a thought object sentiment analysis process, a thought object rating process, or a combination thereof. Confidence score may be associated with the quantified importance of each thought object 510. In an embodiment, the confidence score may be derived from the priority values provided to the thought objects 510. The priority values may be processed to the project controller 502 to identify representative thought objects and provide thought objects with a confidence score. In another embodiment, the confidence score reflects ratings provided by participant device 522. In an embodiment, confidence score may be a cumulative sum of multiple score values, including but not limited to, numRatingsScore, highRatingsScore, and ownThoughtsScore. In an embodiment, numRatingsScore may be operable to favor thought objects 510 that have not received many ratings by participant devices 522. This may be done to ensure that each of the filtered thought objects 510 may have a chance to be selected as one of the highest rated thought objects 510. In some embodiments, the highRatingsScore may be designed to favor thought objects that have higher ratings than other thought objects. In an embodiment, the ownThoughtsScore may be designed to favor, or disfavor thought objects that a participant may themselves have shared. The object theming process may define the best number of themes that may be used while selecting one or more thought objects 510. The selected one or more thought objects 510 are provided to transformer 518 for generating a summary of the received thought objects 510. In some embodiments, one or more thought objects 510 may be selected based on the sentiments associated with the one or more thought objects 510.

Figure 6B:
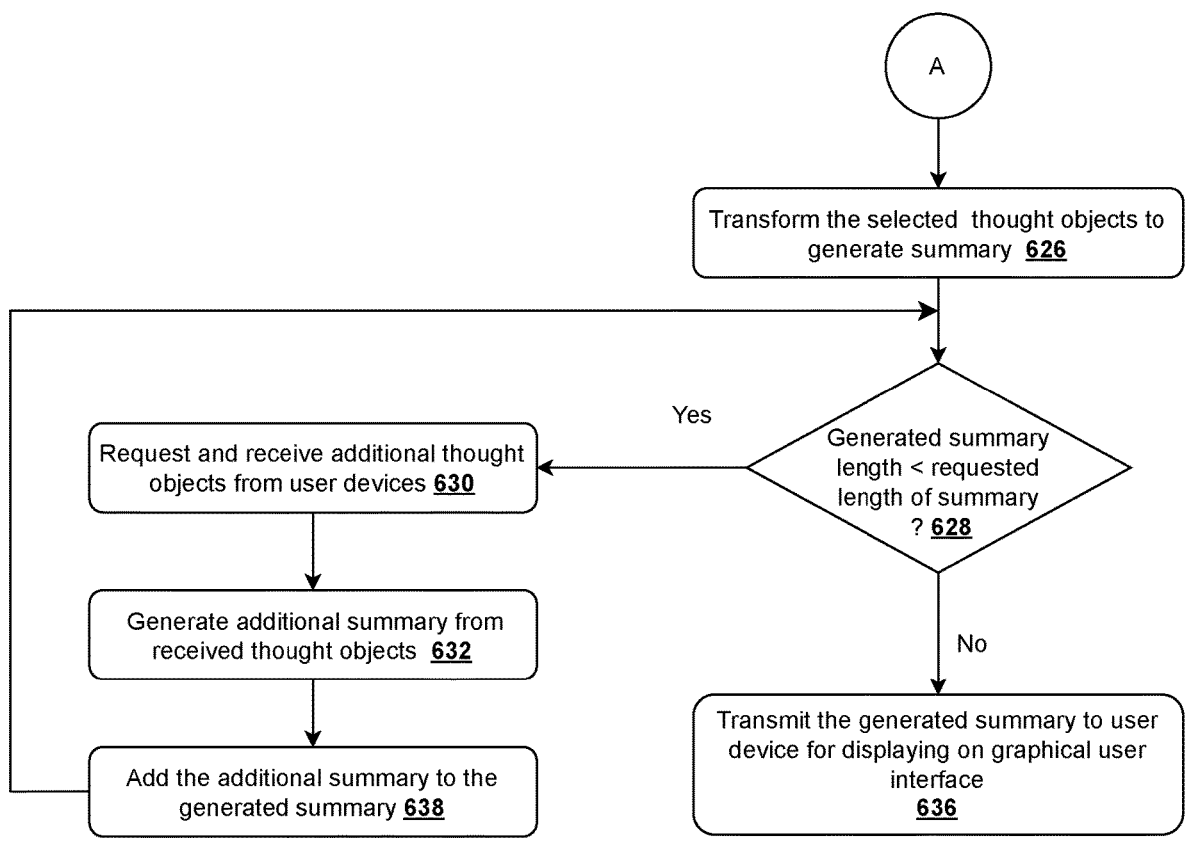
FIG. 6B is a flow diagram illustrating the method of text-to-text transfer transformation for generating a summary from a plurality of thought objects continuing from FIG. 6A.

Referring now to FIG. 6B, at step 626, transformation computer 501 uses transformer 518 to transform the selected one or more thought objects to generate a summary of the qualitative responses received in the plurality of thought objects 510. In an embodiment, transformer 518 may be a software application or a combination of software and hardware. Further in an embodiment, transformer 518 may be software that is loaded from a storage medium and operated by project controller 502 in transformation computer 501. In an embodiment, transformer 518 may generate an abstractive summary for the plurality of thought objects 510 using the selected one or more thought objects.

At step 628, transformation computer 501 performs a check to determine if the length of generated summary is less than the requested length of the summary. When the length of generated summary is less than the requested length of the summary, then at step 630, transformation computer 501 may request and receive additional thought objects from user devices 512. If additional thought objects are not received, transformation computer 501 transmits the generated summary at step 626 to a user device 522 that displays the generated summary on a graphical user interface of the user device 522. At step 630, when additional thought objects are received, additional summary is generated at step 632. At step 638 additional summary is added to the generated summary and transformation computer 501 reforms the check at step 628 with the generated summary again.

When the length of generated summary is not less than the requested length of the summary, then at step 632, transformation computer 501 transmits the generated summary to a user device 522 that displays the generated summary on a graphical user interface of the user device 522. In an embodiment, the generated summary is transmitted to leader device 524 that initiated the question object. In another embodiment, the generated summary may be transmitted to at least a portion of user devices 522 that are providing the qualitative responses via the thought objects 510.

FIG. 6C is a flow diagram illustrating method 600C of text-to-text transfer transformation for generating headlines from the thought objects, according to a preferred embodiment of the invention. When the user does not request a summary and/or the thought objects are below a first pre-defined threshold, transformation computer 501 may perform the method 600C.

At step 621, transformation computer 501 may determine if the plurality of thought objects is below a second pre-defined threshold. The second pre-defined threshold may be set by the user for generating headlines.

When the plurality of thought objects is below the second pre-defined threshold, then at step 623 transformation computer 501 may concatenate the received plurality of thought objects and transform the thought objects to generate a headline. In an example, when the number of thought objects 510 received is less than 25 (i.e., second pre-defined threshold), a headline may automatically be generated by transformer 518 without requiring any clustering of thought objects 510.

When the plurality of thought objects is above the second pre-defined threshold but below the first pre-defined threshold, then at step 625, transformation computer 501 may generate a pre-configured number of clusters from the received plurality of thought objects. For example, when the plurality of thoughts is above 25 transformation computer 501 may generate 20 clusters (i.e., pre-configured number of clusters).

At step 627, may select one or more objects from the generated clusters based on a confidence score, a thought object theming process, a thought object sentiment analysis process, a thought object rating process, or a combination thereof. In an example, when the number of thought objects 510 received is greater than 25 (i.e., second pre-defined threshold), a pre-configured headline may automatically be generated by transformer 518 without requiring any clustering of thought objects 510.

At step 629, transformation computer 501 uses transformer 518 to transform the selected one or more thought objects to generate a headline of the qualitative responses received in the plurality of thought objects 510. At step 631, transformation computer 501 transmits the generated headline to a user device 522 that displays the generated summary on a graphical user interface of the user device 522.

Figure 7:
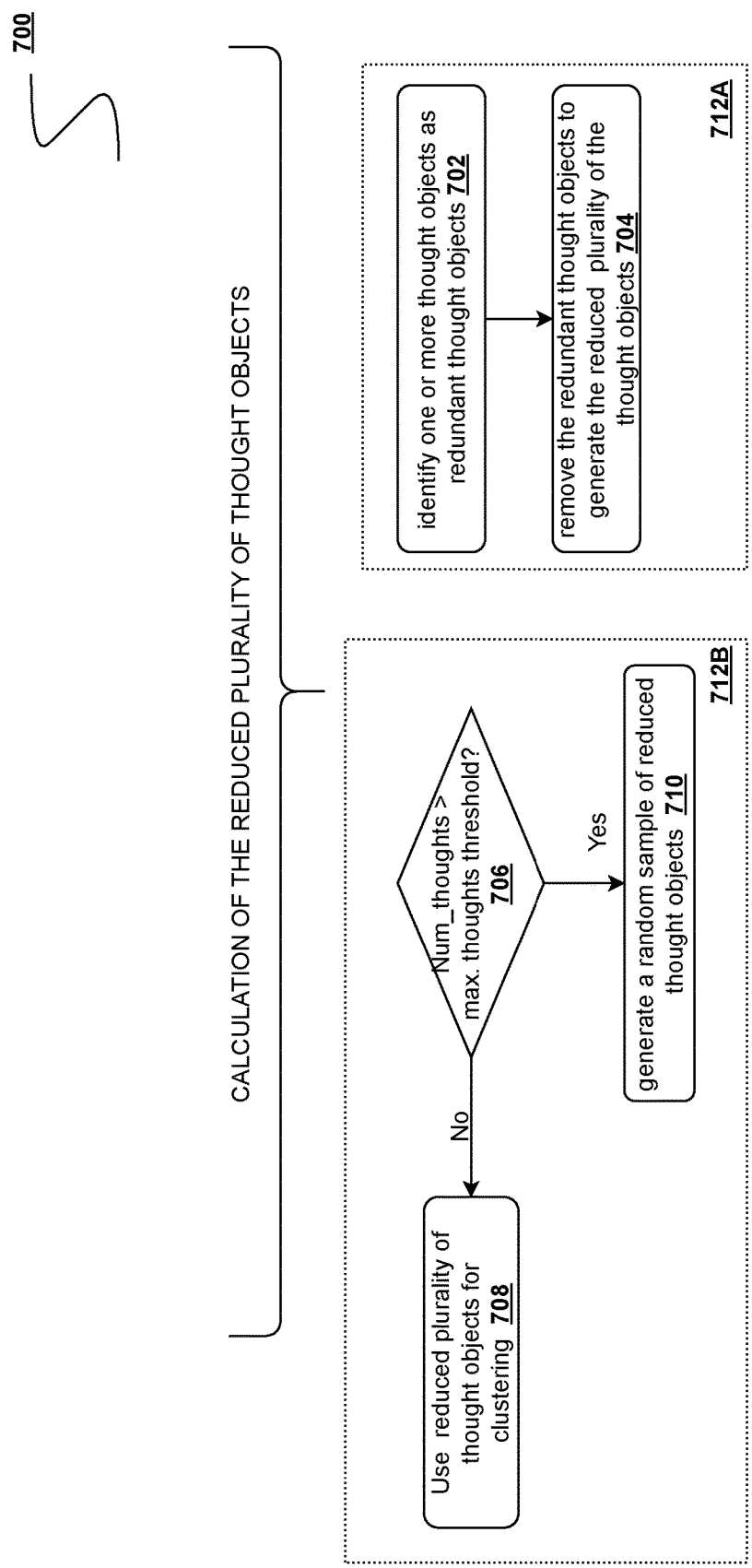
FIG. 7 is a flow diagram illustrating a method for computing a reduced plurality of thought objects, according to a preferred embodiment of the invention.

FIG. 7 is a flow diagram illustrating method 700 for computing a reduced plurality of thought objects 510, according to a preferred embodiment of the invention. When transformation computer 501 receives a large amount of thought objects 510, it becomes a computational overhead for transformation computer 501 to process most or all the received thought objects 510. Further, transformer 518 may not be able to generate an accurate summary. Two different mechanisms used for reducing a large number of thought objects are shown in 712A and 712B.

In 712A, to reduce the number of thought objects 510, transformation computer 501 may perform a check to remove redundant thought objects 510. According to the embodiment at step 702, transformation computer 501 identifies one or more thought objects from the plurality of thought objects 510 as redundant thought objects. One or more thought objects are identified as redundant based on information present in the plurality of thought objects 510. For example, thought objects 510 that have just emoticons or less than a few words may be considered redundant. In an embodiment, thought objects 510 with zero or low priority values may be considered redundant. In another embodiment, thought objects without qualitative_text 513 may be considered redundant. At step 704, the thought objects 510 that are identified as redundant may be removed from the plurality of thought objects 510 to compute the reduced plurality of thought objects 510.

In 712B, transformation computer 501, at step 706 may determine if the plurality of thought objects is greater than a pre-defined maximum thought threshold. At step 706, if transformation computer 501 determines that the plurality of thought objects 510 is below ("No" at step 706) the pre-defined maximum thought threshold, transformation computer 501, at step 708, uses the reduced plurality of thought objects 510 for clustering.

At step 706, if transformation computer 501 determines that the reduced plurality of thought objects 510 is greater ("Yes" at step 706) than the pre-defined maximum thought threshold, transformation computer 501, at step 710, generates a random sample of thought objects 510 from the plurality of thought objects 510 for clustering. The random sample may be referred to as a reduced plurality of thought objects 510. Random sampling may be performed to reduce the number of thought objects for transformer 518. The number of thought objects in the random sample may be based on static value or may be computed based on the number of thought objects received at transformation computer 501.

Once the reduced plurality of thought objects is available, transformation computer 501 calculates the number of clusters to be generated. Clustering is performed on the reduced plurality of thought objects 510 based on the number of clusters. The clustering process associates one or more thought objects 510 of the reduced plurality of thought objects 510 to a cluster from a plurality of clusters. The clustering of the reduced plurality of thought objects allows transformation computer 501 to categorize the received plurality of thought objects 510. The clustering associates one or more of the reduced plurality of thought objects 510 with relevant clusters. The clusters may be generated by associating clusters to the plurality of the thought objects 510 in the reduced plurality of thought objects 510.

Figure 8:
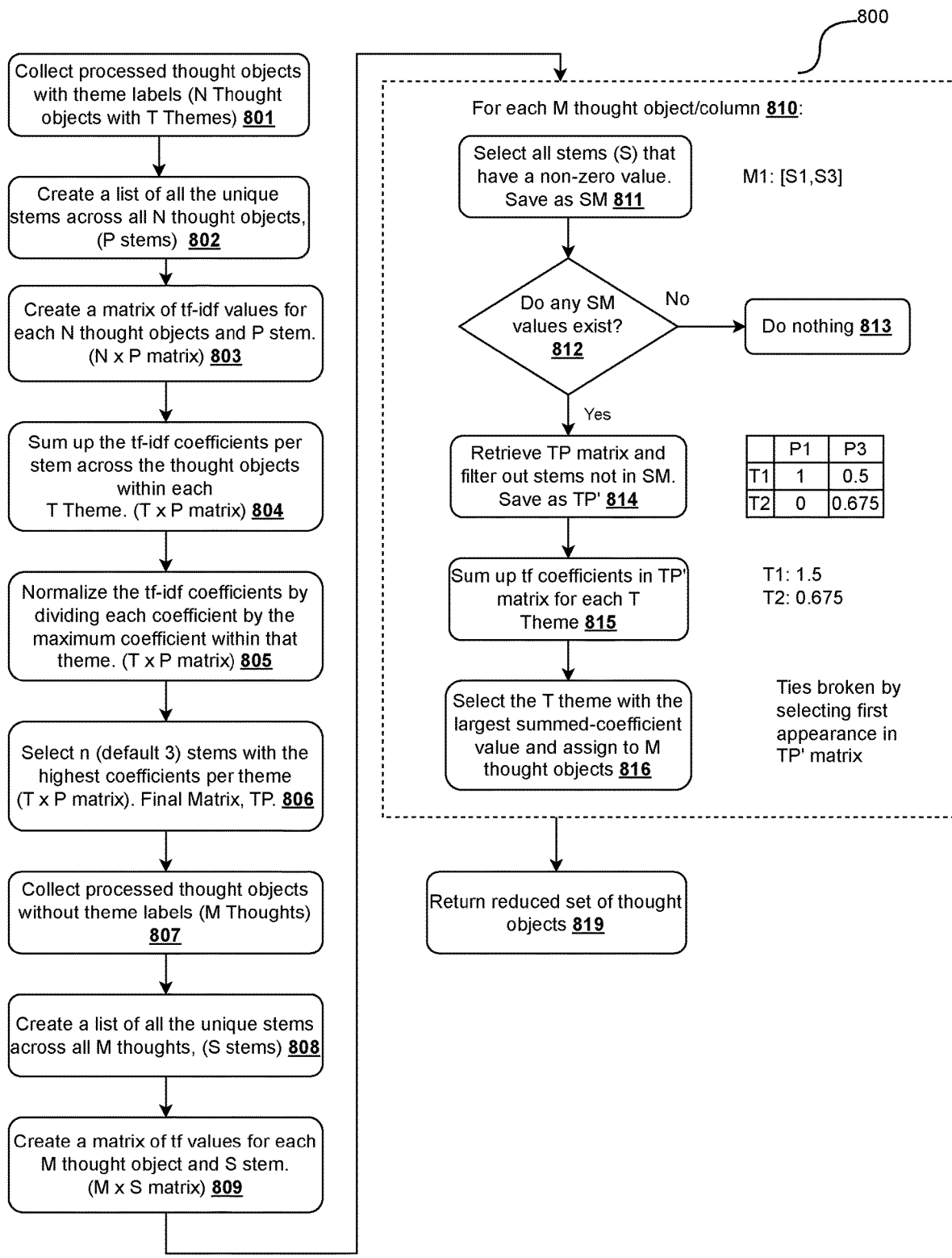
FIG. 8 is a flow diagram illustrating a method for associating a theme to the plurality of thought objects, according to a preferred embodiment of the invention.

FIG. 8 is a flow diagram illustrating method 800 for associating themes to the reduced plurality of thought objects for generating themes. In FIG. 8, transformation computer 501 may identify known themes present in the reduced plurality of thought objects and generate the required themes.

According to the embodiment, in a first step 801, project controller 502 may identify thought objects and associate them with theme labels. Object themer 507 may generate a table of N thought objects 510 that may be associated with T themes. The "N×T" table may identify all thought objects 510, that may be associated with one or more themes using stemming. Object themer 507 may associate the tokens to unique stems (e.g., existing themes).

In a next step 802, object themer 507 may create a list of all unique stems (P stems) across all N thought objects in the reduced plurality of thought objects. For instance, object themer 507 may parse the N thought objects that may be currently associated with T themes, and extract stems from stemDict for all N thought objects, as generated by tokenizer 503. In an embodiment, the stemDict may be a dictionary contain one or more stems, which may be a part of a term used in information retrieval indices. Within the stemDict, each word may be considered to have a stem (defined, for example, in an .STM file or database table) and one or more possible suffixes (defined, for example, in an .SUF file or database table). For example, for the terms "go" and "going", "go" may be considered as the stem and "ing" as the suffix. Entries in the .STM file may consist of the stem word (go) followed by a blank, and then an index entry in the suffix file (.SUF) shall be "go 1". This index indicates which suffix values are acceptable for an associated stem word.

In a next step 803, project controller 502 may create a matrix of tf-idf values for each of the N thought objects and P stems, to create a "N×P" matrix. A tf-idf value may be a value pertaining to term frequency-inverse document frequency, intended to reflect how important a word is to a thought in a collection of thoughts. In an embodiment, the term frequency may be calculated, by project controller 502, using the following exemplary sequence:

tf(w,d)=log (1+f(w,d)), wherein d denotes a given thought from a dataset, w is a given word in a thought, and f(w, d) denotes a frequency of the word w in the thought d. Further, the inverse term frequency may be computed by project controller 502, based on the following exemplary sequence:

idf(w,D)=log (N/f(w,D)), wherein D denotes a collection of all thought objects. The tf-idf score may be computed by project controller 502 using the following exemplary sequence:

tfidf(w,d,D)=tf(w,d)*idf(w,D). For such a computation, project controller 502 may utilize filtered tokenized stems of themed thought objects, as generated using tokenizer 503, as an input value. This value may be denoted as M vectors of all stemmed tokens. The output value may then be a coefficients matrix, generated by project controller 502, that may denote a cross relation between the M vectors and the number of all stems in text associated with themed thought objects (S), in an M×S matrix. In some embodiments, each coefficient may represent the tf-idf value per thought object 510, for that particular stem. In another embodiment, project controller 502 may create the N×P matrix for themed thought objects, using, for example, a "Scikit-Learn" or "sklearn" library.

Referring again to FIG. 8, in a next step 804, project controller 502 may calculate a sum of the tf-idf coefficient values per stem P across the thought objects within each of the T themes, to generate a T×P matrix. In a next step 805, project controller 502 may normalize the tf-idf coefficient values by dividing each coefficient value by a maximum coefficient value within that theme T.

In a next step 806, project controller 502 may select n stems P with the highest coefficients per theme within the T×P matrix. In an embodiment, the default number of stems P that may be selected, may be set to 3 by project controller 502. Based on the selection of the n stems P, a final T×P matrix may be generated by project controller 502. In a next step 807, project controller 502 may collect processed thought objects M, that may have no associated themes.

In a next step 808, project controller 502 may create a list of all unique stems across all M thought objects. The unique stems may be denoted as S. In a next step 809, project controller 502 may create a matrix of term frequency (tf) values for each of the M thought objects and S stems, thereby creating a M×S matrix.

In an embodiment, one or more components of the system may process each of the M thought objects populated in each column of the M×S matrix, starting at step 810. In a next step 811, project controller 502 may select all stems S that have a non-zero value. In an embodiment, the non-zero values may be stored, by project controller 502 in object database 508, as SM. In a next step 812, if the non-zero values SM do not exist, project controller 502 may do nothing at step 813. Otherwise, if the non-zero values exist, in a next step 814, project controller 502 may retrieve the T×P matrix and filter out stems that are not present in SM. Project controller 502 may save such values as a TP'matrix. For instance, stems P1 and P3, with, for example, values 1 and 0.5 for theme T1, respectively, and, for example, values 0 and 0.675, for theme T2, respectively, may be extracted and saved by project controller 502.

In a next step 815, project controller 502 may compute a sum of the tf coefficients in TP'matrix for each of the themes T. Referring again to the above example, the sum for theme T1 would be, for example, 1+0.5=1.5; and the sum for the theme T2 would be, for example, 0+0.675=0.675. In a next step 816, project controller 502 may select the theme T with the largest summed-coefficient value and assign the theme T to each M thought object. In the above example, project controller may assign theme T1, with a larger summed-coefficient value as 1.5, to the thought object.

In a next step 819, a reduced set of thought object 510 may be returned.

The skilled person will be aware of a range of possible modifications of the various embodiments described above. Accordingly, the present invention is defined by the claims and their equivalents.

What is claimed is:

1. A system for text-to-text transfer transformation, the system comprising:
   a transformation computer comprising a processor, a memory, and a plurality of programming instructions, the plurality of programming instructions when executed by the processor cause the processor to:
      receive a plurality of thought objects, the plurality of thought objects each comprising qualitative responses;
      receive a requested length of summary from a user device; and
      responsive to the requested length of summary and the plurality of thought objects being above a summary length threshold and above a first pre-defined threshold respectively:
         compute a reduced plurality of thought objects by reducing a quantity of thought objects comprised within the plurality of thought objects;
         calculate a number of clusters to be generated based on requested length of summary and a number of thought objects in the reduced plurality of thought objects;
         generate the calculated number of clusters by analyzing a semantic vector representation of thought objects in the reduced plurality of thought objects;
         select one or more thought objects from the generated clusters for text-to text transfer transformation;
         transform the selected one or more thought objects to generate a summary of the qualitative responses in the received plurality of thought objects; and
         transmit the summary to the user device, wherein the summary is displayed on a graphical user interface associated with the user device.

2. The system of claim 1, wherein to compute the reduced plurality of thought objects the plurality of programming instructions when executed by the processor, further cause the processor to:
   identify one or more thought objects from the plurality of thought objects as redundant thought objects, wherein the redundant thought objects are identified based on information present in the plurality of thought objects; and remove the identified redundant thought objects from the plurality of the thought objects to compute the reduced plurality of thought objects.

3. The system of claim 1, wherein to compute the reduced plurality of thought objects, the plurality of programming instructions when executed by the processor, further cause the processor to:
responsive to the plurality of thought objects being above a pre-defined maximum thought threshold, generate a random sample from the plurality of the thought objects.

4. The system of claim 1, wherein to generate the clusters from the reduced plurality of thought objects, the plurality of programming instructions when executed by the processor, further cause the processor to associate a cluster, of a first plurality of clusters, to at least a portion of thought objects of the reduced plurality of thought objects.

5. The system of claim 1, wherein the plurality of programming instructions when executed by the processor, further cause the processor to select the one or more thought objects from each of the generated clusters using one or more confidence scores, a thought object theming process, a thought object sentiment analysis process, a thought object rating process, or a combination thereof.

6. The system of claim 5, wherein the one or more confidence scores are indicative of a quantified importance of each thought object.

7. The system of claim 1, wherein the plurality of programming instructions when executed by the processor, further cause the processor to:
responsive to determining that the plurality of thought objects is above a second respective pre-defined threshold, generate a pre-defined number of clusters;
select one or more thought objects from the generated pre-defined number of clusters for text-to text transfer transformation;
transform the selected one or more thought objects to generate a headline for the qualitative responses in the received plurality of thought objects; and
transmit the headline to the user device, wherein the summary is displayed on the graphical user interface associated with the user device.

8. The system of claim 7, wherein the plurality of programming instructions when executed by the processor, further cause the processor to:
responsive to determining that the plurality of thought objects is below a second respective pre-defined threshold, transform the plurality of thought objects into a headline; and
transmit the headline to the user device, wherein the summary is displayed on the graphical user interface associated with the user device.

9. The system of claim 1, wherein the plurality of programming instructions when executed by the processor, further cause the processor to:
responsive to determining that the plurality of thought objects is above the second pre-defined threshold and below the first pre-defined threshold, generate a pre-defined number of clusters;
transform the plurality of thought objects to generate a summary for the qualitative responses in the received plurality of thought objects; and
transmit the summary to the user device, wherein the summary is displayed on the graphical user interface associated with the user device.

10. The system of claim 1, wherein the plurality of programming instructions when executed by the processor, further cause the processor to generate a pre-configured number of clusters responsive to the requested length of summary being lower than the summary length threshold.

11. A computer implemented method for text-to-text transformation, the method comprising:
receiving, by a text transformation computer a plurality of thought objects, the plurality of thought objects each comprising qualitative responses;
receiving a requested length of summary from a user device; and
responsive to the requested length of the summary and the plurality of thought objects being above a summary length threshold and above a first pre-defined threshold respectively:
computing a reduced plurality of thought objects by reducing a quantity of thought objects comprised within the plurality of thought objects;
calculating a number of clusters to be generated based on the requested length of summary and the number of thought objects in the reduced plurality of thought objects;
generating the calculated number of clusters by analyzing a semantic vector representation of thought objects in the reduced plurality of thought objects;
selecting one or more thought objects from the generated clusters for text-to-text transformation;
transforming the selected one or more thought objects to generate a summary of the qualitative responses in the received plurality of thought objects; and
transmitting the summary to the user device, wherein the summary is displayed on a graphical user interface associated with a user device.

12. The method of claim 11, wherein to compute the reduced plurality of thought objects comprises the steps of:
identifying one or more thought objects from the plurality of thought objects as redundant thought objects, wherein the redundant thought objects are identified based on information present in the plurality of thought objects; and
removing the identified redundant thought objects from the plurality of thought objects to compute the reduced plurality of thought objects.

13. The method of claim 11, wherein the computation of the reduced plurality of thought objects further comprises the steps of:
responsive to the plurality of thought objects being above a pre-defined maximum thought threshold, generating a random sample from the plurality of the thought objects.

14. The method of claim 11, wherein the generation of clusters from the reduced plurality of thought objects, comprises associating a cluster, of a first plurality of clusters, to at least a portion of thought objects of the reduced plurality of thought objects.

15. The method of claim 11, wherein the method further comprises analyzing the semantic vector representation from each cluster using one or more confidence scores, a thought object theming process, a thought object sentiment analysis process, a thought object rating process, or a combination thereof.

16. The method of claim 15, wherein the one or more confidence scores are indicative of a quantified importance of each thought object.

17. The method of claim 9, wherein the method further comprises the steps of:

responsive to determining that the plurality of thought objects is above a second respective pre-defined threshold, generating a pre-defined number of clusters;

select one or more thought objects from the generated pre-defined number of clusters for text-to text transfer transformation;

transforming the selected one or more thought objects to generate a headline for the qualitative responses in the received plurality of thought objects; and transmitting the headline to the user device, wherein the summary is displayed on the graphical user interface associated with the user device.

18. The method of claim 17, wherein the method further comprises the steps of:

responsive to determining that the plurality of thought objects is below a second respective pre-defined threshold, transforming the plurality of thought objects into a headline; and transmitting the headline to the user device, wherein the summary is displayed on the graphical user interface associated with the user device.

19. The method of claim 1, wherein the method further comprises the steps of:

responsive to determining that the plurality of thought objects is above the second pre-defined threshold and below the first pre-defined threshold, generating a pre-defined number of clusters;

transforming the plurality of thought objects to generate a summary for the qualitative responses in the received plurality of thought objects; and transmitting the summary to the user device, wherein the summary is displayed on the graphical user interface associated with the user device.

20. The method of claim 11, wherein the method further comprises generating a pre-configured number of clusters responsive to the requested length of summary being lower than the summary length threshold.

* * * * *